3,009,208
PROCESS FOR PRODUCTION OF TUBULAR BLOWN FOILS OF POLYVINYL CHLORIDE INTERPOLYMERS
Ernst Pirot, Wuppertal-Barmen, Germany, assignor to J. P. Bemberg Aktiengesellschaft, Wuppertal-Oberbarmen, Germany
Filed Feb. 21, 1958, Ser. No. 716,634
Claims priority, application Germany Mar. 2, 1957
4 Claims. (Cl. 18—57)

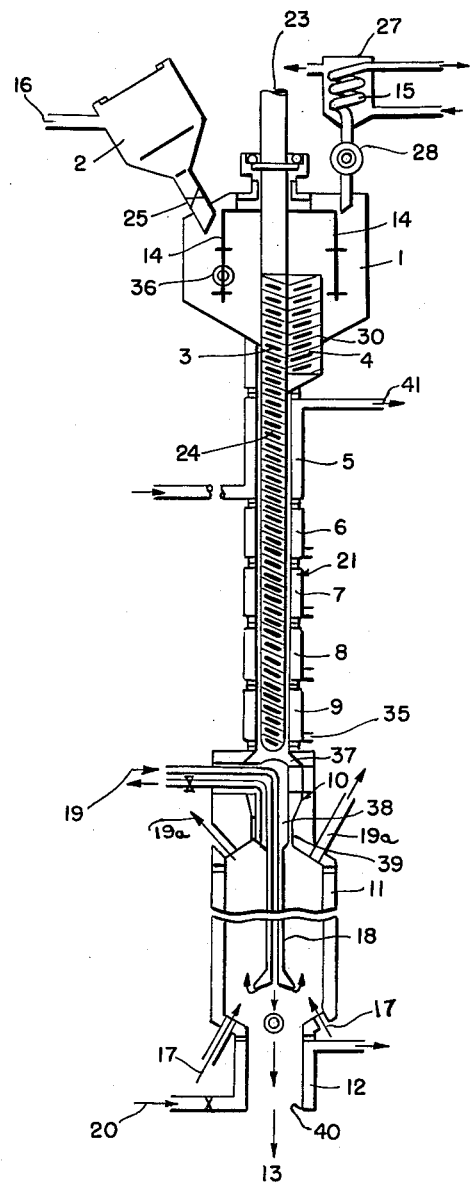

This invention relates to a process for the production of tubular foils of polyvinyl chloride interpolymers wherein decomposition, due to excessive temperatures heretofore essential to the operation, has been avoided.

More particularly, this invention relates to a process for the production of tubular foils of polyvinyl chloride and interpolymers of polyvinyl chloride of substantially transparent nature, free from odor and color-producing decomposition products, particularly suited for use in packaging and transportation of foodstuffs.

Heretofore, foils and tubes of polyvinyl chloride and interpolymers of polyvinyl chloride have been produced by means of rollers as is common in calendering processes. Usually the procedure is carried forward by conducting either a cast foil from a solution or a previously calendered sheet of interpolymer over heated rollers under pressure whereby the foil is reduced in thickness and increased in dimension until of the appropriate thickness for its ultimate use. Heretofore in processing, as described above, emulsions have been used containing alcohols, oils, waxes and resins homogeneously dispersed and distributed in the interpolymers.

In the prior art processing of interpolymers of polyvinyl chloride, serious limitations have been faced due to the tendency of hydrogen chloride to be liberated from the interpolymers which, under the usual conditions of processing, cannot escape and causes an autocatalytic decomposition reaction in the polymeric material. Hydrogen chloride liberation and decomposition of polyvinyl chloride polymers takes place rapidly at temperatures especially from about 180° C. upwards. As the temperature is increased the rate of decomposition is also increased. Thus, a serious limitation is met in the amount of heat which may be used in forming films and foils of polyvinyl chloride and polyvinyl chloride containing interpolymers.

It is known that decomposition due to release of autocatalytic hydrogen chloride can be controlled in part and prevented in part by compounding the above class of interploymers with known stabilizers. These stabilizers in general operate by reacting with or otherwise removing from immediate contact with the polymer the hydrogen chloride as it is released. Many stabilizers are already known and new stabilizers are being constantly introduced. Among those in use are, for example, a number of organic tin compounds, illustratively dibutyl tin dilaurate, calcium ricinoleate, phenylindol, and other hydrogen chloride acceptors both of organic and inorganic nature. Despite a relative value of these materials to prevent the development of discoloration in films and foils, they are not altogether successful and even when present in formation of polyvinyl chloride films and foils at temperatures essential to malaxation, extrusion and blowing, objectionable decomposition takes place.

Blown foils are obtained which fail to meet requirements for commercial acceptance, particularly in the packaging of foodstuffs. Blown foils produced by prior art processes must be able to withstand relatively high temperatures of the order of 190° C. to 210° C. in order that the mass may be handled during the blowing or tubular film-forming step.

Still another disadvantage of attempting to form tubular films of polyvinyl chloride by the prior art processes lies in the fact that prior art equipment can be operated only a brief period of time before the products of partial decomposition clog and render the apparatus useless. Generally the prior art apparatus becomes so fouled that it must be subjected to cleaning after periodic use of the order of 8–10 hours.

A further limitation upon the prior art method of forming tubes of polyvinyl chloride is that polymers having a K-value only up to about 60 can be used. As the K-value has relation to the molecular weight of the polymer, it is a limitation upon the quality of polymer which may be employed for packaging purposes. If one attempts to utilize interpolymers of polyvinyl chloride having K-values of the order of 70, the difficulties of processing through heating and calendering as presently practiced with lower molecular weight materials are multiplied. On the other hand, higher molecular weight materials are particularly desired for use in tubes and foils because they are more free from odor and tastes which may be transferred to delicate foodstuffs.

In the method proposed herein, polyvinyl chloride interpolymers are combined with a particular class of volatile organic solvents which do not belong to any particular chemical class of compositions but which are definable in relation to their physical specifications.

The useful volatile organic solvents, for the purposes of this invention, are limited to those which have a boiling point between about 100° C. and about 210° C. which, at normal or room temperatures (25° C.) are non-solvents for polyvinyl chloride interpolymers but act as diluents for said interpolymers when in solution at room temperature. These diluents or non-solvents for polyvinyl chloride interpolymers at room temperature will, however, when heated with the polymers at temperatures above 100° C. exert solvent action causing the polymeric substances to become somewhat gelatinous in nature and of decreased shear resistance despite the fact that the K-values thereof may be in excess of 60 and of the order of 70.

The volatile organic solvents which serve as diluents at room temperature and solvents at temperatures above 100° C. include a wide variety of volatile organic solvents. Among the illustrative classes are aliphatic ethers, aliphatic esters, volatile aromatic hydrocarbon compounds, cycloaliphatic compounds, substituted aromatic and cycloaliphatic compounds particularly those containing halogen substituents, etc. Additionally and specifically illustrative are dipropyl ether, dibutyl ether, the higher dialkyl ether homologues, glycol monoethyl ether, glycol monopropyl ether, glycol monoacetate, glycol diacetate, glycol monopropionate, glycol dipropionate; the well known mixed esters illustrative of which are glycol monoacetate monopropionate, glycol monopropionate monobutyrate, etc. Illustrative of the aromatic compounds are toluene, xylene and the halogen substituted aromatic compounds including monochloro-benzene, monochloro-toluene, dichlorotoluene, etc. Multiple ring aromatic compounds are also useful and include as illustrative, tetrahydro-naphthalene, decahydro-naphthalene, etc. Still other compounds are useful as will be apparent from the foregoing exemplary compounds which suggest others from which groups one skilled in the art may select many other species than those specifically set out herein.

In the method of malaxation and extrusion of this invention, the polyvinyl chloride interpolymers, illustratively, 100 parts by weight of the same, are thoroughly intermixed with from 5 to 25 parts by weight of the volatile organic diluent-solvent as described above which is a diluent and a non-solvent for said interpolymer at room temperature but a gelatinizing solvent for the interpolymer at temperatures above 100° C. A first intermixing is carried out in a closed vessel under anaerobic environment wherein the free space is saturated with the vapors of the diluent-solvent selected. A second or more extensive intermixing or malaxation is preferably carried out in a specialized apparatus, which is described hereafter in greater detail, but may also be carried out in a dough mixer or other jacketed heavy duty mixing equipment (Werner-Pfleiderer dough mixer) under carefully controlled processing conditions. In any case, the process of intermixing of the volatile organic solvent, polyvinyl chloride interpolymer, and preferably a stabilizer, is subjected to malaxation and extrusion steps as the temperature is slowly increased from room temperature to not above about 180° C. and more particularly from 100° C. to 180° C. under carefully controlled increment increase in temperature between the limits indicated. By thus slowly intermixing, malaxation and extrusion under anaerobic environment in an atmosphere surrounded by a diluent vapor, the polyvinyl chloride interpolymer is progressively changed from a heterogeneous mixture of diluent and polymer as the temperature is increased to a more and more homogeneous gelatinous product.

At the upper limit of temperature but not above about 180° C., the gelatinous material may be extruded in the form of a strand. It may thereafter be reduced in length and is in a condition to be transferred to a second operation whereupon a blowing mechanism, as known in the art, acts to transform the physical nature of the processed interpolymer into tubes, foils, etc. Forming in this manner could not be accomplished heretofore with polymers having a K-value of the order of 60 and above without decomposition. The decomposition in forming is sufficient to render the ultimate foil unsuited for commercial application and particularly for use in food packaging. Preferably, however, the blowing mechanism for the formation of the foil follows directly and immediately subsequent to the described method of preparation of homogeneous gelatinous polyvinyl chloride interpolymers for extrusion.

As blowing mechanisms are well known and not, of themselves, a part of this invention, detailed description thereof is not essential to the present invention in apparatus and process.

The term "polyvinyl chloride interpolymers" as used herein is intended to include interpolymers containing a major percentage of vinyl chloride, for example, the percentage of vinyl chloride may be varied from 100% to about 85% with at most 15% of a second polymerizable monomer compound interpolymerized therewith. Interpolymers of polyvinyl chloride are well known in the art and include, as illustrative of the minor component, vinylidene chloride, vinyl acetate, vinyl methyl ketone, acrylic acid methyl ester, methacrylic acid, and other alkyl acrylic acids and esters, etc.

In carrying forward the processes of this invention, a particular apparatus has been developed which is preeminently suited to the ends of accurate control and trouble-free production of polyvinyl chloride interpolymer tubes and foils. The invention in relation to the apparatus can best be described and understood by reference to the drawings:

The principal figure is a longitudinal section through the center of the apparatus. Referring more in particular to the drawings, a first entry chamber 1 is mounted above a second elongated central chamber 21 which, in a preferred form of the invention, feeds to an extrusion orifice 37 leading into a blasting head 10. A central shaft 23 is deeply threaded along the greater part of its length with helical threads 24. Shaft 23 is mounted centrally within the entry chamber 1 and the elongated central chamber 21. Raw material, including polyvinyl chloride interpolymer, stabilizer and solvent, is fed through inlet means 16 into the receiving vessel 2 having control valve 25 making it possible to seal the interior of chamber 1 and 21 to provide an anaerobic atmosphere saturated with the selected diluent-solvent. A heat exchanger 27, containing the tubular heat exchange coil 15 for condensing excess solvent vapor, is also controlled by means of valve 28 (and other valves not shown) so that the apparatus may be operated under pressures increased or diminished over normal atmospheric pressure, or may be operated at atmospheric pressure depending upon the nature of the solvent-diluent selected for use in the method. A second screw 30 axially parallel to shaft 23 and in approximate contact at its outer periphery with screw 24 is adapted to rotate in an opposite direction to shaft 23 thereby kneading and forcibly directing material fed to the upper chamber 1 downwardly through chamber 21 by the positive screw feed resulting from the rotation of shaft 23, urging the mix downward by means of the action of helical screws 24 and 4.

Temperature control within the elongated central chamber 21 is maintained by a plurality of heat exchangers 9, 8, 7, 6 and 5 mounted in series along its length and about its periphery having ingress 35 and egress means 41 for pumping into and through each of said units a heat exchange fluid.

In one modification of the invention, the hot heat exchange fluid may be forced into the bottom entry 35 of heat exchanger 9 and thence upward countercurrently to the flow of material downwardly through the elongated central chamber 21, in sequence through heat exchanger 9, 8, 7, 6, 5 and thus to discharge through the exit tube 41 of heat exchanger 5. Again alternatively, each of the heat exchangers 5, 6, 7, 8 and 9 may be electrically heated and controlled by automatic or manual means within a pre-set temperature range limit. For example, in one use and application of the apparatus, heat exchanger 5 is held between 90° and 100° C., heat exchanger 6 at 130° C., heat exchanger 7 at 140° C., number 8 at 150° C., and number 9 heat exchanger between 160° and 180° C. The upper entry chamber 1 may also be provided with agitator units 14 which assist in intermingling of the interpolymer, stabilizers volatile organic diluents therefor, etc. The organic diluent can, if desired, be metered into the chamber by a metering pump through orifice 36.

As the interpolymer and diluent are intensively intermixed, kneaded and forced downwardly through elongated tube 21, past zones of increasing temperature, the intermixture begins to gelatinize slowly as the inactive diluent transforms to an active solvent for the interpolymer as the temperature of the diluent is increased. Before entry into the blasting head 10 the malaxated gelatinized mixture is forced through the orifice 37 and may be collected at this point as an extruded strand to be reduced in length for further processing.

Preferably, however, blasting head 10 is immediately adjacent and following orifice 37 and the gelatinized interpolymer directly subjected to blowing by extrusion about mantle 38 and between it and the orifice 39. Gases may be passed in at 19 and through element 18 interiorly of the tube while other gases are passed through orifices 17 and about the exterior of the tube and out at 19a to provide control of the forming tube of polyvinyl chloride at this point. As the formed tubular foil passes out at 13 through orifice 40, the diameter controlling and calibrating mantle 12 held at a temperature of 70°–75° C. assists in control of the thickness of and the diameter of the tube so extruded.

As the formed tubular foil is removed at 13, it may thereafter pass through a pair of squeezing rollers, a cutting device and a pair of winding rollers as is oftentimes used in this art. Solvent-diluent which may be held in the extruded tubular foil is removed at least in part by means of air injection at 17 and 18. Injected air may be forced through the drying chamber 11 under controlled temperature to remove the solvent present in the foil.

The following examples are included as illustrative only and are not to be construed as limiting.

*Example I*

85 parts by weight of polyvinyl chloride (K-value about 70) are mixed with 15 parts by weight of a solvent-diluent mixture, to which 1% (with reference to the quantity of the polymerizate) of calcium ricinoleate is added as a stabilizer, in container 1. The solvent mixture consists of 66% toluene and 34% ethyl glycol (=glycol monoethyl ether). The temperature of the extruder increases throughout its length from 100° C. at the point of entry to 120° C. at the exit point. From the polymerizate gelatinized at the upper temperature levels with the solvent strand is formed which is reduced to a fine granulate and is processed in special apparatus at 160° to form blown foils. The solvent is evaporated from the foil tube as it is formed by air streams at about 150° C. blown inside and outside the foil tube. The calibrating mantle controlling the foil tube diameter and foil thickness is maintained at a temperature of 70° to 75° C.

*Example II*

87 parts by weight of an interpolymer consisting of 85% vinyl chloride and 15% vinyl acetate (K-value 70) are mixed with 13 parts by weight of a solvent mixture, to which 1.5% of phenylindol (with reference to the quantity of the interpolymer) is added as a stabilizer. The solvent mixture consists of 66% ethyl glycol (=glycol monoethyl ether) and 34% propyl glycol (=glycol monopropyl ether). The temperature along the path of malaxating and extrusion during the heating of the mixture rises in uniform increments of increase from 135° to 170° C. At these temperatures, with the application of a slight vacuum, a gas atmosphere of the diluent forms in the free space of the containing vessel providing an anaerobic environment. The excess gas is condensed. The gelatinized interpolymer plus diluent-solvent is blown directly over a blasting head directly connected with the extruder. Thus an entirely odorless tube is formed. The volatilized solvent-diluent is recovered for re-use.

The K-value as referred to above is a parameter denoting the molecular size of the polymer and has relation to the temperature at which the material tends to become thermoplastic as well as the viscosity of solutions thereof. The general range of K-value of polyvinyl chloride interpolymers may be as low as 10 and as high as 150 or more with values of 30 to 100 more generally referred to as in the low to high range. Additional information relative to the term K-value as it applies to polymers may be found in "Cellulosechemie," 13, 58, 1932, by H. Fikentscher.

Having thus described my invention, I claim:

1. A method of manufacture of an article of a polyvinyl chloride interpolymer which comprises combining the said interpolymer material with 5-25 parts by weight of a volatile organic solvent per 100 parts by weight of said interpolymer, which solvent is a diluent and non-solvent for said interpolymer at 25° C. but a gelatinizing solvent for said interpolymer at temperatures above 100° C., in a closed vessel under anaerobic environment, malaxating said polymer at a plurality of gradually increasing temperatures ranging from about 100° C. to not more than about 180° C. to gelatinize said interpolymer, and thereafter extruding the gelatinized interpolymer through a forming zone.

2. A method of manufacture of an article of a polyvinyl chloride interpolymer which comprises combining 100 parts by weight of the said interpolymer material with from about 5 to about 25 parts by weight of a volatile organic solvent having a boiling point between 100° C. and about 210° C. which is a diluent and non-solvent for said interpolymer at 25° C. but a gelatinizing solvent for said interpolymer at temperatures above 100° C., in a closed vessel under anaerobic environment, malaxating and extruding said polymer through a plurality of gradually increasing temperature zones ranging from about 100° C. to not more than about 180° C. to gelatinize said interpolymer, and thereafter continuing extrusion of the gelatinized interpolymer through a forming zone prior to blowing the same into a foil form.

3. A method of manufacture of tubular foil of a polyvinyl chloride interpolymer, said interpolymer having a K-value of at least about 60, which comprises combining 100 parts by weight of the said interpolymer material with from 5 to about 25 parts by weight of a volatile organic solvent having a boiling point between 100° C. and about 210° C., which is a diluent and non-solvent for said interpolymer at 25° C. but a gelatinizing solvent for said interpolymer at temperatures above 100° C., in a closed vessel under an anaerobic and solvent vapor environment, malaxating and extruding said polymer through a plurality of gradually increasing temperature zones ranging from about 100° C. to not more than about 180° C. to gelatinize said interpolymer, and thereafter continuing extrusion of the gelatinized interpolymer through a suitable orifice and blowing the extruded solvent-containing interpolymer into tubular foil form at a temperature below 180° C.

4. The process in accordance with claim 3 wherein said extruded solvent-containing interpolymer is blown without intervening processing into said tubular foil form.

References Cited in the file of this patent

UNITED STATES PATENTS

| | | |
|---|---|---|
| 2,447,056 | Cooper | Aug. 17, 1948 |
| 2,461,975 | Fuller | Feb. 15, 1949 |
| 2,461,976 | Schenk | Feb. 15, 1949 |
| 2,668,323 | Johnson | Feb. 9, 1954 |
| 2,668,324 | Johnson | Feb. 9, 1954 |
| 2,721,114 | Downing | Oct. 18, 1955 |
| 2,750,631 | Johnson | June 19, 1956 |
| 2,791,000 | Bechtold | May 7, 1957 |
| 2,810,702 | Bechtold et al. | Oct. 22, 1957 |
| 2,824,780 | Satterthwaite | Feb. 25, 1958 |
| 2,867,495 | Myers | Jan. 6, 1959 |